United States Patent
Kruse et al.

(10) Patent No.: US 12,090,966 B2
(45) Date of Patent: Sep. 17, 2024

(54) ADAPTER UNIT

(71) Applicant: Robert Bosch GmbH, Stuttgart (DE)

(72) Inventors: Michael Kruse, Sinzheim (DE); Godelieve Kraemer, Huegelsheim (DE); Helmut Depondt, Boutersem (BE); Herve Bratec, Wilsele (BE); Marcello Bubba, Linden (BE); Stijn Truyens, Tienen (BE)

(73) Assignee: Robert Bosch GmbH, Stuttgart (DE)

( * ) Notice: Subject to any disclaimer, the term of this patent is extended or adjusted under 35 U.S.C. 154(b) by 579 days.

(21) Appl. No.: 17/264,038

(22) PCT Filed: Jun. 8, 2019

(86) PCT No.: PCT/EP2019/065052
§ 371 (c)(1),
(2) Date: Jan. 28, 2021

(87) PCT Pub. No.: WO2020/025204
PCT Pub. Date: Feb. 6, 2020

(65) Prior Publication Data
US 2021/0347334 A1     Nov. 11, 2021

(30) Foreign Application Priority Data
Jul. 30, 2018    (DE) .................... 10 2018 212 661.5

(51) Int. Cl.
*B60S 1/38*      (2006.01)
*B60S 1/04*      (2006.01)
*B60S 1/40*      (2006.01)

(52) U.S. Cl.
CPC ........... *B60S 1/3863* (2013.01); *B60S 1/0408* (2013.01); *B60S 1/40* (2013.01); *B60S 1/4083* (2013.01)

(58) Field of Classification Search
CPC ...... B60S 1/0408; B60S 1/381; B60S 1/3806; B60S 1/40; B60S 1/3863; B60S 1/3849; B60S 2001/4061; B60S 2001/4035
(Continued)

(56) References Cited

U.S. PATENT DOCUMENTS

2006/0230571 A1\* 10/2006 Son .......................... B60S 1/40
                                                                  15/250.43
2008/0134455 A1\* 6/2008 Kinnaert ............... B60S 1/4048
                                                                  15/250.43
(Continued)

FOREIGN PATENT DOCUMENTS

DE           19856299 A1    6/2000
DE           10309080 A1    9/2004
(Continued)

OTHER PUBLICATIONS

Translation of International Search Report for Application No. PCT/EP2019/065052 dated Aug. 26, 2019 (2 pages).

*Primary Examiner* — Gary K. Graham
(74) *Attorney, Agent, or Firm* — Michael Best & Friedrich LLP

(57) ABSTRACT

The invention relates to an adapter unit which is provided for coupling, in particular releasably coupling, a wiper blade to a wiper arm, having a wind deflecting surface which is designed to deflect inflowing air and press the wiper blade against a vehicle windshield. According to the invention, the wind deflecting surface has at least one first sub-surface and a second sub-surface, wherein the first sub-surface has a different orientation than the second sub-surface and/or the first sub-surface has a different geometry than the second sub-surface.

28 Claims, 11 Drawing Sheets

(58) Field of Classification Search
USPC .................................... 15/250.201, 250.32
See application file for complete search history.

(56) References Cited

U.S. PATENT DOCUMENTS

2013/0269143 A1* 10/2013 Weber ................. B60S 1/3856
  15/250.48
2015/0096142 A1* 4/2015 Zeiser ................. B60S 1/4003
  15/250.201
2016/0375870 A1 12/2016 Espinasse et al.

FOREIGN PATENT DOCUMENTS

| DE | 102013220255 A1 | 4/2015 |
| EP | 3045357 A1 | 7/2016 |
| FR | 2556297 A1 | 6/1985 |
| FR | 2992921 A1 | 1/2014 |
| WO | 2014064199 A1 | 5/2014 |

* cited by examiner

ADAPTER UNIT

BACKGROUND OF THE INVENTION

The invention relates to an adapter unit which is provided for connecting, in particular releasably connecting, a wiper blade to a wiper arm, having a wind deflector face.

There have already been proposed wiper devices comprising a wiper arm and a wiper blade and an adapter unit for releasably connecting a wiper arm to a wiper blade. Such wiper devices have the disadvantage that the wiper arm always has to apply a high pressing force for pressing the wiper blade against a vehicle window in order to ensure adequate wiping power.

SUMMARY OF THE INVENTION

The present invention relates to an adapter unit which is provided for connecting, in particular releasably connecting, a wiper blade to a wiper arm, having a wind deflector face which is configured to deflect an incoming flow of air and to press the wiper blade against a vehicle window, characterized in that the wind deflector face has at least a first part-face and a second part-face, wherein the first part-face has a different orientation from the second part-face and/or wherein the first part-face has a different geometry from the second part-face.

This has the advantage that the wind deflector face presses the wiper blade against the vehicle window at high-speed travel as a result of the travel wind flowing against it. This increases a total pressing force of the wiper blade against the vehicle window and improves the wiping power. The necessary pressing force with which the wiper arm presses the wiper blade against the vehicle window is thereby reduced. A more favorable and/or simpler and/or more reliable and/or more compact wiper arm can be used with a smaller pressing force, in particular with a smaller spring to apply the pressing force. Furthermore, using a wind deflector face according to the present invention prevents the adapter unit or a wiping device—comprising the adapter unit, the wiper blade and the wiper arm—from generating, as a result of unfavorable aerodynamics during high-speed travel, a force which acts counter to the required pressing force and which would thus worsen the wiping power or would even make wiping impossible. The adapter unit according to the present invention ensures that, as a result of aerodynamic effects, in particular a wind, in particular travel wind, a resultant force presses the wiper blade onto the vehicle window. In that the first part-face and the second part-face each have a different geometry and/or a different orientation, precise adjustment of pressing forces is possible, in particular an orientation of the pressing forces.

The fact that the first part-face has a different orientation from the second part-face is particularly intended to be understood to mean that a first normal vector of the first part-face or a first averaged normal vector is not arranged parallel with a second normal vector of the second part-face or a second averaged normal vector of the second part-face. The second part-face has a different orientation from the first part-face. The term "averaged normal vector" of a face is intended to be understood to mean a vector which constitutes the mean over all or almost all the normal vectors of the face.

The fact that the first part-face has a different geometry from the second part-face is particularly intended to be understood to mean that the first part-face has a different curvature and/or a different surface-area and/or a different diagonal length and/or different side lengths and/or a different extent of the periphery and/or different side angles and/or a different shape in comparison with the second part-face.

The adapter unit can be constructed integrally with the wind deflector face. The term "integrally" is intended to be understood in this context to be connected in particular in a materially engaging manner, such as, for example, by a welding process and/or an adhesive process, etc., and particularly advantageously formed-on, such as by production from a casting and/or by production in a single-component or multi-component injection-molding method.

It is particularly conceivable for the adapter unit to be integrally constructed with the first part-face and/or the second part-face.

The adapter unit may have at least a first part-piece and a second part-piece, wherein the first part-piece has the first part-face and the second part-piece has the second part-face. Advantageously, the first part-piece is constructed integrally with the first part-face and/or the second part-piece is constructed integrally with the second part-face. The first part-piece and the second part-piece can be connected in a materially engaging manner, such as, for example, by a welding process and/or an adhesive process, etc., and/or connected in a positive-locking manner, such as, for example, by clip-fitting and/or insertion and/or engagement and/or screwing.

Advantageously, the adapter unit has a wiper arm connection element which is provided for directly or indirectly connecting to the wiper arm. Advantageously, the adapter unit is constructed integrally with the wiper arm connection element.

Advantageously, the adapter unit has a wiper arm connection element which is provided for directly or indirectly connecting to the wiper blade. Advantageously, the adapter unit is constructed integrally with the wiper blade connection element.

As a result of the features set out in the dependent claims, advantageous developments of the adapter unit are possible.

It is particularly advantageous for the wind deflector face to enclose a main angle between 25° and 75°, preferably between 40° and 60° with a wind flow direction. In this manner, good aerodynamic properties of the adapter unit are enabled with a sufficiently great structural space of the adapter unit, in particular for receiving the wiper arm connection element.

The term "main angle" is intended to be understood to mean the angle which the wind deflector face has with respect to the wind flow direction. Advantageously, the main angle is measured about the wiper arm direction. In this case, a positive main angle between 0° and 90° describes a wind deflector face which at least partially faces the wind flow direction. The nearer the main angle is to 90°, the greater the extent to which the wind deflector face is directed toward the wind flow direction. The term "wind flow direction" is intended to be understood to mean the direction in which the travel wind would flow in a non-wiping rest state of the adapter unit which is applied to the vehicle window or a wiper device—comprising the adapter unit, the wiper blade and the wiper arm.

Advantageously, the main angle is defined between the wind flow direction and a projection of the wind flow direction onto the wind deflector face, wherein the projection is advantageously carried out along a projection plane, in which the wind flow direction is located and which is arranged perpendicularly or substantially perpendicularly to the wiper arm direction. It is also possible for the projection plane to be defined by the wind flow direction and a normal vector or a mean normal vector of the wind deflector face. In a curved or non-planar wind deflector face, it is conceivable for the main angle to be defined between the wind flow direction and a tangential plane, wherein the tangential plane is located in a marked point—for example, the center—of the wind deflector face or is the tangential plane of a mean normal vector of the wind deflector face. The term "mean normal vector" is intended to be understood to mean a vector which constitutes the mean over all or almost all the normal vectors of the wind deflector face.

The aerodynamics of the adapter unit is further improved if the first part-face and/or the second part-face is orientated at least in regions parallel and/or substantially parallel with a wiper arm direction. The term "wiper arm direction" is intended to be understood to mean a direction which is arranged in a direction of a greatest longitudinal extent of the wiper arm which is mounted on the adapter unit, in particular in a basic position. In the non-mounted state, the wiper arm direction is the direction on the adapter unit in which a mounted wiper arm would be directed, in particular in a basic position. The fact that a part-face is orientated parallel with a wiper arm direction is particularly intended to be understood to mean that a tangential vector of the part-face or a mean tangential vector of the part-face is orientated parallel with the wiper arm direction. A mean tangential vector is a vector which is located in the tangential plane of the mean normal vector. If the part-face is constructed to be planar, a tangential vector is located in a plane in which the part-face is located.

The term "substantially parallel" is intended to be understood to mean that a first axis encloses with a second axis an angle which deviates from 0° by no more than 8°, advantageously no more than 5°, particularly advantageously no more than 2°. The term "substantially perpendicularly" is intended to be understood to mean that a first axis encloses with a second axis an angle which deviates from 90° by no more than 8°, advantageously no more than 5°, particularly advantageously no more than 2°.

The adapter unit has a particularly good aerodynamics if a separation line is orientated between the first part-face and the second part-face at least in regions perpendicularly and/or substantially perpendicularly relative to the wiper arm direction. Advantageously, the first part-face and the second part-face coincide at least in regions at the separation line. In particular, a connection region between the first part-face and the second part-face can extend along the separation line. Advantageously, the separation line is linear or substantially linear.

An adapter unit, in which the first part-face and/or the second part-face is constructed at least in regions to be planar or substantially planar has the advantage that it is easy to produce and has good aerodynamic properties. The term "substantially planar face" is intended to be understood to mean a face which can be placed in a notional plane in such a manner that a maximum spacing from this plane is less than 7% of a greatest diameter of the plane, preferably less than 3%, particularly preferably less than 1%.

An adapter unit is particularly advantageous in which the first part-face is arranged at a first angle between 0° and 45°, preferably between 5° and 30°, particularly preferably between 10° and 20° relative to the second part-face, wherein the first angle is the angle between a surface normal of the first part-face and a surface normal of the second part-face. In this case, a "surface normal" is intended to be understood to mean a part-face, in particular a normal vector of the part-face—preferably in a planar or substantially planar part-face—and/or a mean normal vector of the part-face—preferably in a curved part-face.

The adapter unit is further improved if the first part-face and the second part-face coincide at least partially in the separation line and define a second angle at the separation line, wherein the second angle is located at an outer side of the wind deflector face or at a wind-facing side of the wind deflector face and the second angle is between 180° and 270°, preferably between 190° and 235°, particularly preferably between 200° and 220°. Such a wind deflector face is in particular constructed to be convex. Preferably, the second angle is defined between a first beam which extends from a reference point on the separation line in the direction of the first part-face and which is arranged perpendicularly to the separation line and tangentially to the first part-face—and a second beam which extends from the reference point on the separation line in the direction of the second part-face and which is arranged perpendicularly to the separation line and tangentially to the second part-face.

The adapter unit is further improved if the first part-face and the second part-face coincide at least partially in the separation line and define a third angle at the separation line, wherein the third angle is located at an outer side of the wind deflector face or at a wind-facing side of the wind deflector face and the third angle is between 90° and 180°, preferably between 135° and 170°, particularly preferably between 150° and 160°. Such a wind deflector face is in particular constructed to be concave. Preferably, the third angle is defined between a first beam which extends from a reference point on the separation line in the direction of the first part-face and which is arranged perpendicularly to the separation line and tangentially to the first part-face—and a second beam which extends from the reference point on the separation line in the direction of the second part-face and which is arranged perpendicularly to the separation line and tangentially to the second part-face.

The aerodynamics of the adapter unit is further improved by an upper face which is arranged at a downwind side of the wind deflector face and which is orientated parallel or substantially parallel with the wiper arm direction and wherein the upper face encloses an upper angle between 10° and 25°, preferably between 15° and 20° with a wind flow direction so that the upper face is configured to deflect an incoming flow of air and to press the wiper blade against a vehicle window. In this manner, a laminar flow extent of a wind which flows round the adapter unit is promoted.

The adapter unit is further improved if the upper face is constructed to be convex at least in regions. Preferably, the upper face is convex in the wind flow direction. The fact that a face of the adapter unit is constructed to be convex is particularly intended to be understood to mean that the face is dished outward from the adapter unit.

If the adapter unit has a rear side which is arranged at a side of the adapter unit opposite the wind deflector face and which is arranged at a downwind side of the adapter unit, wherein the rear side is tilted by a rear angle between 10° and 40°, preferably between 20° and 30° relative to a surface normal of an adapter unit base face, so that the rear side projects beyond the adapter unit base face in the wind flow direction, this has the advantage that turbulence in the air flowing round the adapter unit is minimized.

The aerodynamics of the adapter unit is further improved by a wiper-arm-facing surface which is configured to introduce and/or receive the wiper arm for connection to the adapter unit, wherein the wiper-arm-facing surface is tilted by a right-handed angle between 10° and 40°, preferably between 20° and 30° relative to a surface normal of an adapter unit base face. In this manner, sufficient pressing pressure is also ensured during a wiping operation, in which the adapter unit or the wiping system is moved out of the rest position.

A further improvement is achieved if the wiper-arm-facing surface is constructed to be concave at least in regions. Advantageously, the wiper-arm-facing surface is constructed to be concave at least in regions in the direction of the surface normal. The fact that a surface of the adapter unit is constructed to be concave is particularly intended to be understood to mean that the surface is dished into the adapter unit.

The aerodynamics of the adapter unit is further improved by a wiper-arm-remote surface which is arranged opposite a side of the adapter unit which is provided so that the wiper arm is connected to the adapter unit at that side, wherein the wiper-arm-remote surface is tilted by a left-handed angle between 10° and 40°, preferably between 20° and 30° relative to a surface normal of an adapter unit base face. In this manner, sufficient pressing pressure is also ensured during a wiping operation, in which the adapter unit or the wiping system is moved out of the rest position.

A further improvement is achieved if the wiper-arm-remote surface is constructed to be convex at least in regions. Advantageously, the wiper-arm-remote surface is constructed to be convex at least in regions in the direction of the surface normal.

If the adapter unit is configured to connect the wiper arm to the wiper blade so as to be pivotable about a bearing axis, this has the advantage that an optimum pressing force can be substantially ensured over an entire wiping range on the vehicle window, in particular in the case of curved vehicle windows.

Advantageously, the adapter unit is constructed so that the bearing axis is arranged parallel or substantially parallel with the wind flow direction. Advantageously, the adapter unit is constructed so that the bearing axis is arranged perpendicularly or substantially perpendicularly to a wiper arm direction. Advantageously, the bearing axis is arranged parallel or substantially parallel with an intended wiping direction. Advantageously, the bearing axis is arranged so that it is arranged in a non-wiping rest state of the wiper device, which is applied to the vehicle window and which comprises the wiper arm adapter unit, the wiper blade and the wiper arm, parallel or substantially parallel with a wind flow direction or a vehicle travel direction. Particularly advantageously, the bearing axis is located in a state mounted on the vehicle parallel with the vehicle window, preferably at any position over a wiping movement.

An adapter unit is particularly advantageous comprising a wiper arm adapter unit and a wiper blade adapter unit, wherein the wiper arm adapter unit is provided for connecting to the wiper arm and the wiper blade adapter unit is provided for receiving the wiper blade, wherein the wiper blade adapter unit has a wiper blade adapter unit receiving member which is provided to receive the wiper blade adapter unit so as to be pivotable about the bearing axis. In this manner, at any time of a wiping movement a particularly favorable aerodynamics of a connection region between the adapter unit and the wiper arm can be ensured.

Advantageously, the wiper arm adapter unit is constructed integrally with the wind deflector face and/or with the wiper blade adapter unit receiving member. Advantageously, the wiper arm adapter unit can be securely connected to the wiper arm, in particular so that the wiper arm in the state connected to the wiper arm adapter unit substantially cannot be moved relative to the wiper arm adapter unit.

The term "wiper blade adapter unit" is particularly intended to be understood to mean an adapter which has a contact region with respect to the wiper blade or a wiper blade component and which can be connected to the wiper blade or the wiper blade component, advantageously can be securely connected thereto, particularly can be connected so that the wiper blade in the state connected to the wiper blade adapter unit substantially cannot be moved relative to the wiper blade adapter unit. Advantageously, the wiper blade adapter unit has a connection element which is provided to pivotably connect to the wiper blade adapter unit receiving member of the wiper arm adapter unit. Advantageously, the wiper blade adapter unit is constructed integrally with the contact region and/or the connection element. It is also conceivable for the wiper blade adapter unit to be constructed integrally with the wiper blade or a wiper blade component. Advantageously, the wiper blade adapter unit receiving member is constructed in such a manner that the bearing axis is arranged perpendicularly or substantially perpendicularly to a wiper arm direction.

An adapter unit is particularly advantageous comprising a base element, a covering element and a wiper arm receiving member which is provided to receive the wiper arm so as to be pivotable about the bearing axis, wherein the covering element is constructed so as to be connectable to the base element and substantially covers the wiper arm receiving member, and wherein the covering element has the wind deflector face, and wherein the base element is configured to receive the wiper blade, and wherein in particular the covering element is constructed to be securely connectable to the base element so that the covering element connected to the base element is substantially non-movable relative to the base element. In this manner, at any time of a wiping movement a particularly favorable aerodynamics of a connection region between the adapter unit and the wiper blade can be ensured.

Advantageously, the covering element is constructed integrally with the wind deflector face. Advantageously, the covering element has a connection element which is provided to be connected to the base element. Advantageously, the covering element is constructed integrally with the connection element. The term "base element" is particularly intended to be understood to mean an adapter which has a contact region with respect to the wiper blade or a wiper blade component and which can be connected to the wiper blade or the wiper blade component, advantageously can be securely connected thereto, particularly can be connected so that the wiper blade in the state connected to the base element substantially cannot be moved relative to the base element. Advantageously, the base element has a receiving element which is provided to be connected to the covering element or the connection element of the covering element. Advantageously, the wiper blade adapter unit is constructed integrally with the contact region and/or with the connection element. It is also conceivable for the base element to be constructed integrally with the wiper blade or with a wiper blade component. Advantageously, the base element has the wiper arm receiving member. Advantageously, the base element is constructed integrally with the wiper arm receiving member. Advantageously, the wiper arm receiving member is constructed in such a manner that the bearing axis is arranged perpendicularly or substantially perpendicularly to a wiper arm direction.

BRIEF DESCRIPTION OF THE DRAWINGS

Embodiments of the adapter unit according to the present invention are illustrated in the drawings and explained in greater detail in the following description. In the drawings.

DETAILED DESCRIPTION

Figure 1:
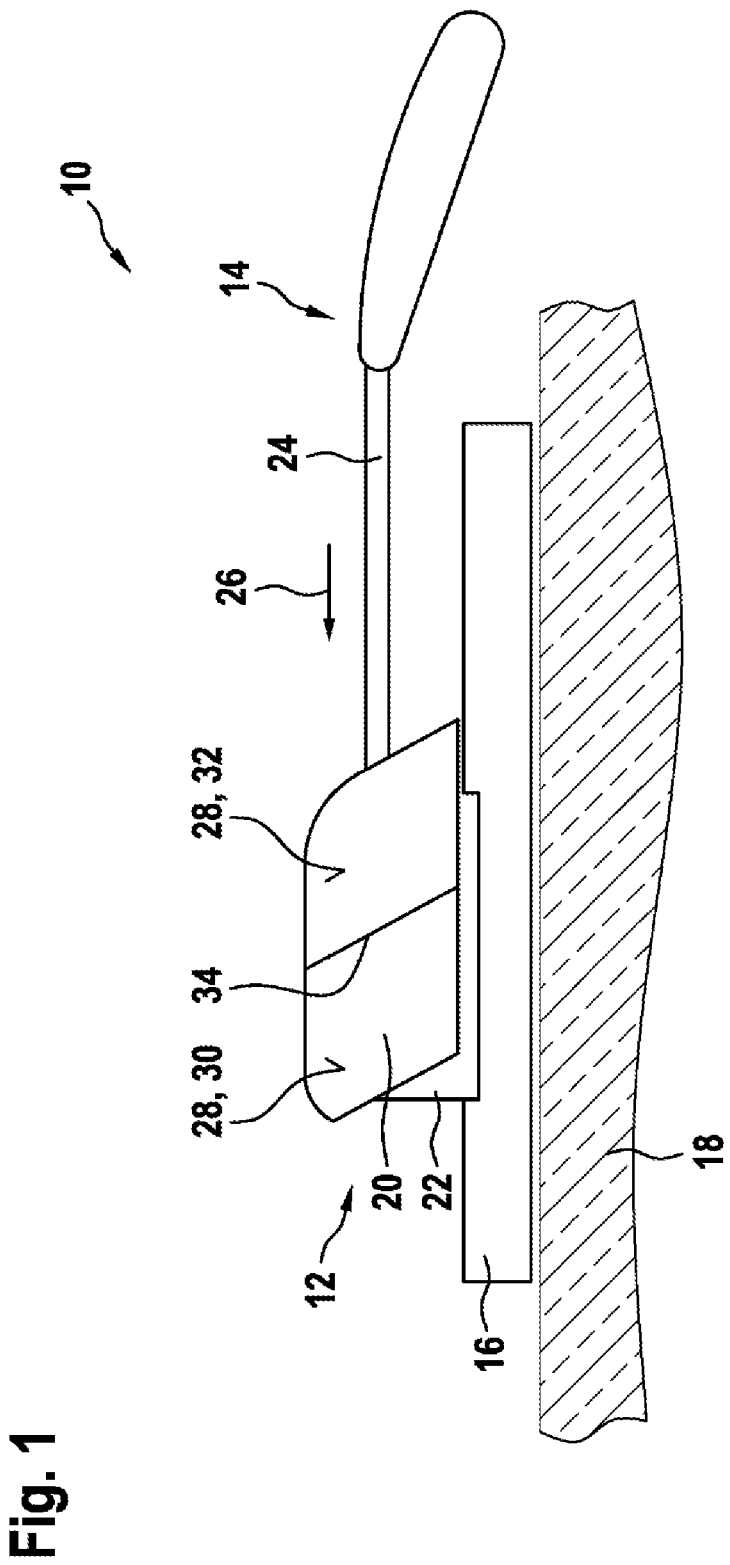
FIG. 1 shows a wiper device with an adapter unit.

In the different construction variants, the same members are indicated with the same reference numerals.

FIG. 1 is a schematic side view of a wiper device 10 having an adapter unit 12, a wiper arm 14 and a wiper blade 16. The wiper blade 16 is constructed as a flat wiper blade. The wiper blade 16 is provided to clean a vehicle window 18. The adapter unit 12 has a covering element 20. The adapter unit has a base element 22. The wiper arm 14 has a wiper rod 24. In the embodiment, a main longitudinal extent direction of the wiper arm adapter unit is arranged parallel with a wiper arm direction 26. A main longitudinal extent direction of the wiper blade is arranged parallel with the wiper arm direction. In advantageous variants, the main longitudinal extent direction of the wiper arm adapter unit is arranged at least substantially parallel with a wiper arm direction 26. In advantageous variants, the main longitudinal extent direction of the wiper blade is arranged at least substantially parallel with the wiper arm direction. The covering element has a wind deflector face 28. The wind deflector face has a first part-face 30 and a second part-face 32. The first part-face and the second part-face are separated by a separation line 34.

Figure 2:
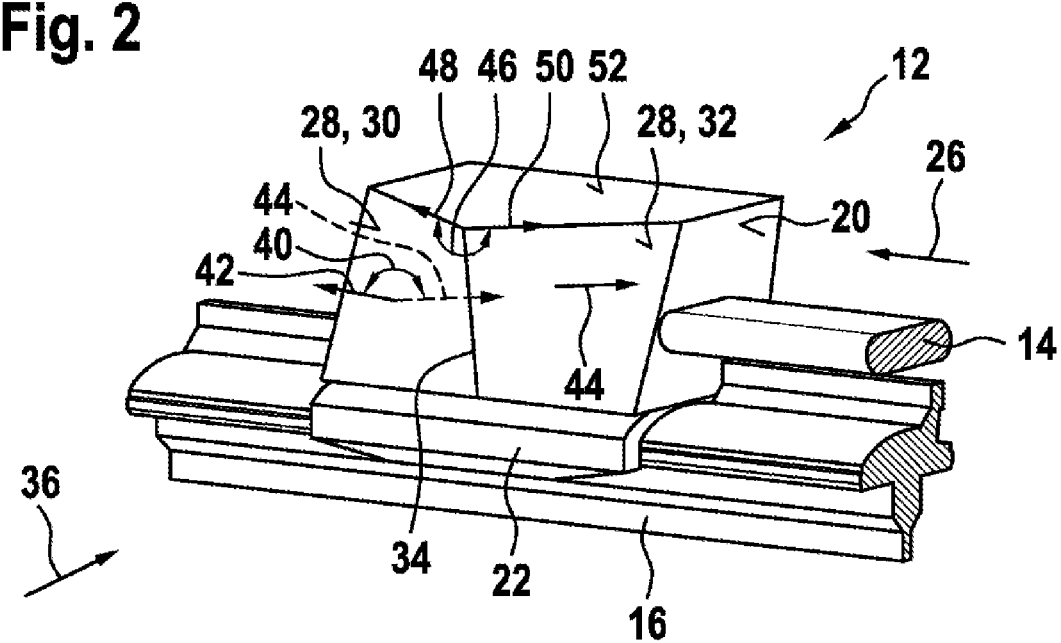
FIG. 2 is a perspective view of the adapter unit.

FIG. 2 is a perspective view of the adapter unit 12. The first part-face 30 has a different orientation from the second part-face 32. In particular, the first part-face 30 has a different orientation with respect to a wind flow direction 36 from the second part-face 32.

Figure 3:
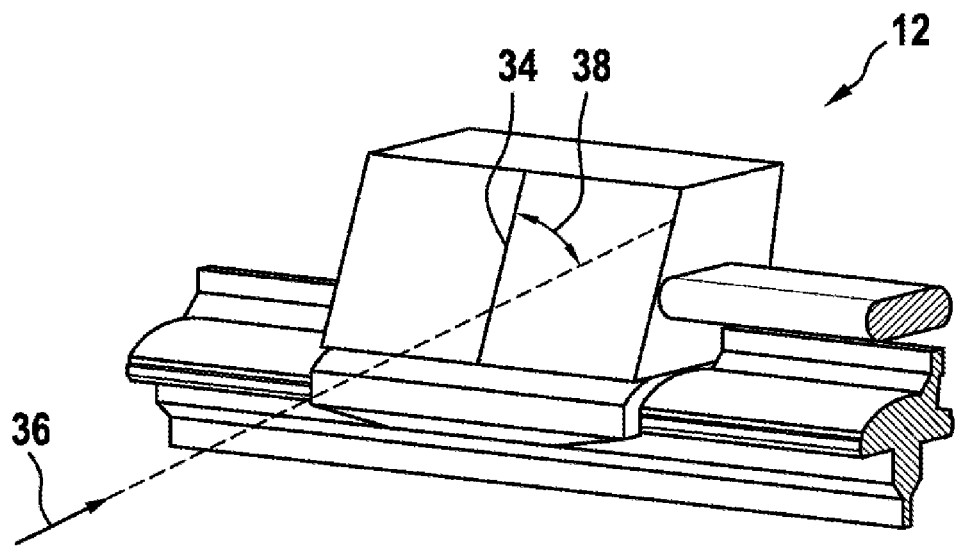
FIGS. 3 to 11 are perspective views of different variants of the adapter unit.

FIG. 3 is a perspective view of a variant of the adapter unit 12, in which the wind deflector face 28 encloses a main angle 38 of 50° with the wind flow direction 36.

Figure 4:
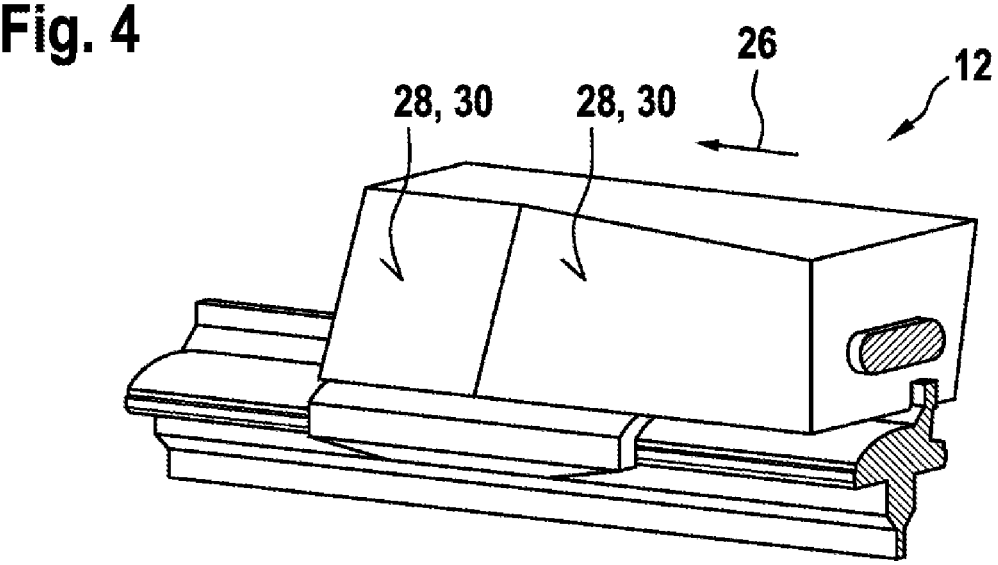

FIG. 4 is a perspective view of a variant of the adapter unit 12, in which the first part-face is orientated parallel with the wiper arm direction. In this variant, the first part-face further has a different geometry from the second part-face. The first part-face has a smaller surface-area than the second part-face.

Figure 5:
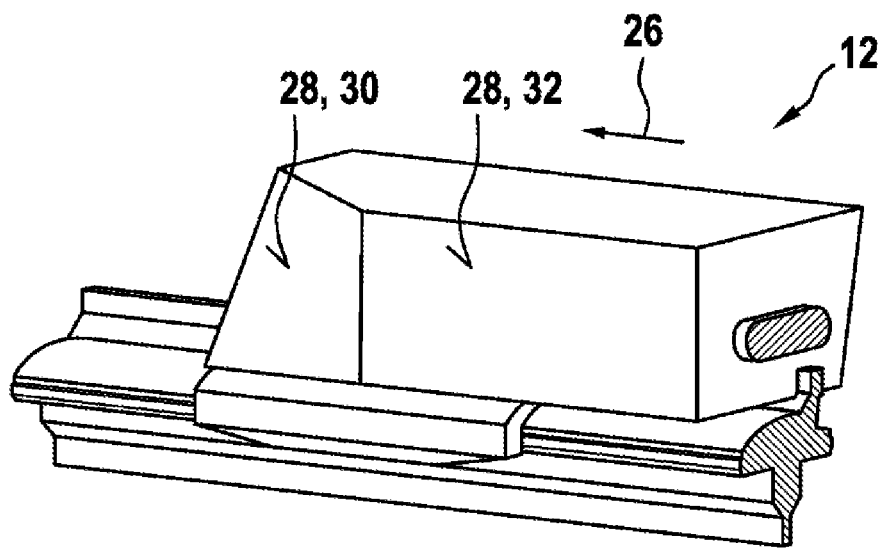

FIG. 5 is a perspective view of another variant of the adapter unit 12, in which the second part-face is orientated parallel with the wiper arm direction. In this variant, the first part-face also further has a different geometry from the second part-face. The first part-face has a smaller surface-area than the second part-face.

Figure 6:
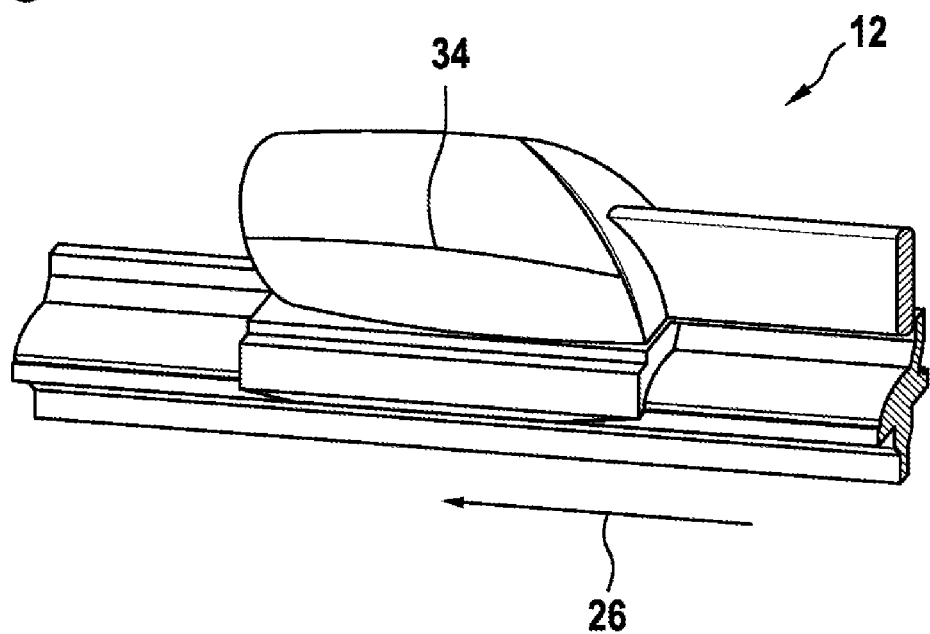
Figure 7:
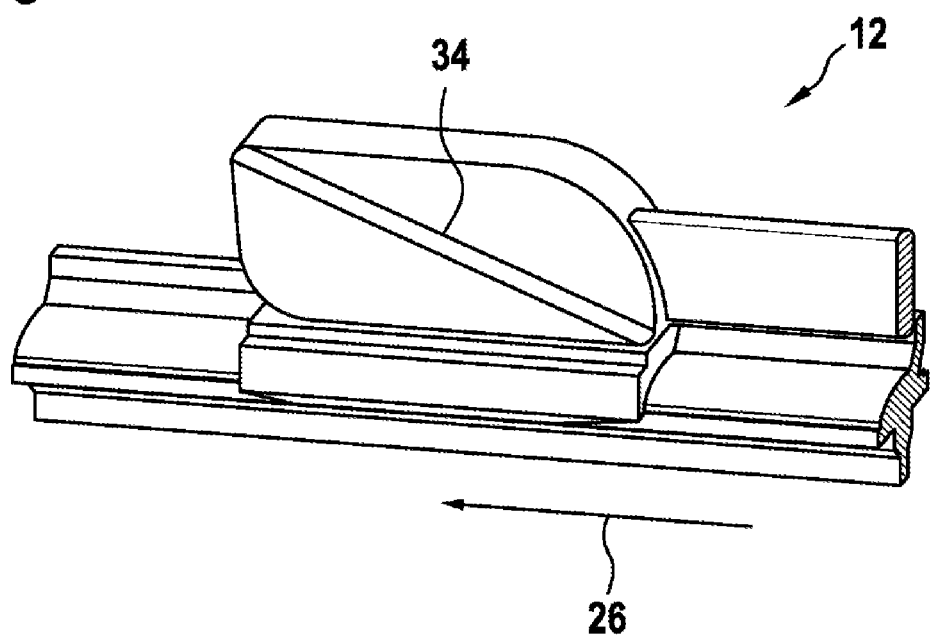
Figure 8:
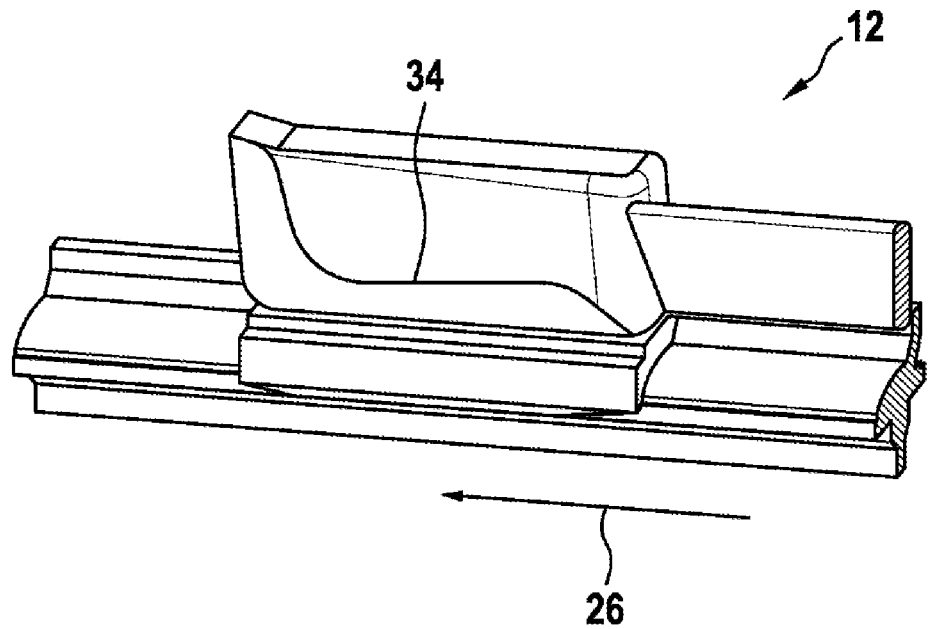

In the embodiment, the separation line 34 extends perpendicularly to the wiper arm direction 26 (see FIG. 2). In alternative embodiments, the separation line 34 may have a different orientation relative to the wiper arm direction. FIG. 6 shows a variant, in which the separation line 34 extends substantially parallel with the wiper arm direction 26. FIG. 7 illustrates a variant, in which the separation line is arranged at an angle of 45° relative to the wiper arm direction. The separation line extends substantially diagonally over the wind deflector face. FIG. 8 shows a variant, in which the separation line has a repeatedly curved extent. The separation line is partially S-shaped. This allows a particularly precise adaption of a desired pressing force, in particular a pressing force direction at any point of the adapter unit.

In the embodiment, the first part-face is arranged at a first angle 40 of 35° relative to the second part-face (see FIG. 2). The first angle 40 is enclosed between a first normal vector 42 of the first part-face and a second normal vector 44 of the second part-face.

In the embodiment, the first part-face and the second part-face define a second angle 46 of 215° at the separation line. The second angle 46 is defined by a first beam 48 of the first part-face and a second beam 50 of the second part-face.

Figure 9:
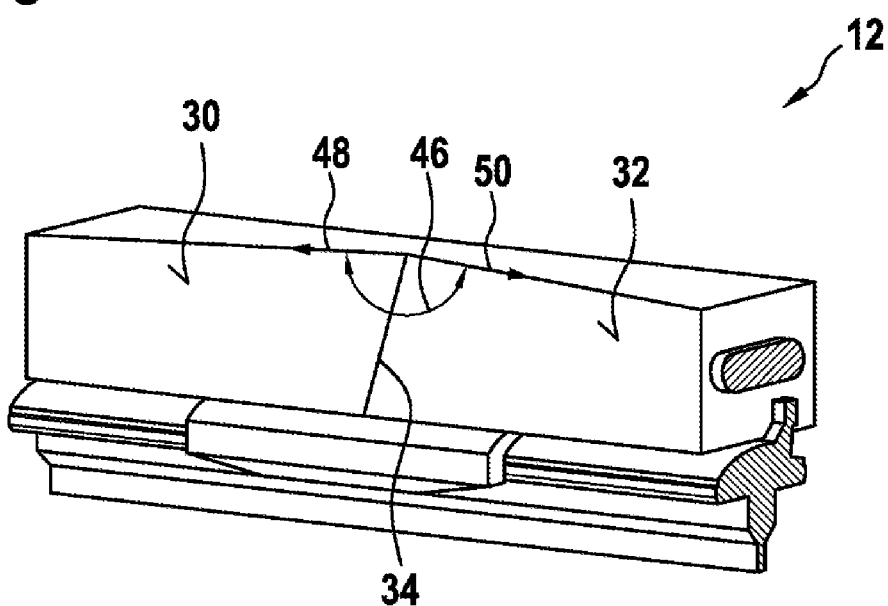

FIG. 9 shows a variant, in which the first part-face and the second part-face define a second angle 46 of 155° at the separation line. The second angle 46 is defined by a first beam 48 of the first part-face and a second beam 50 of the second part-face.

Figure 10:
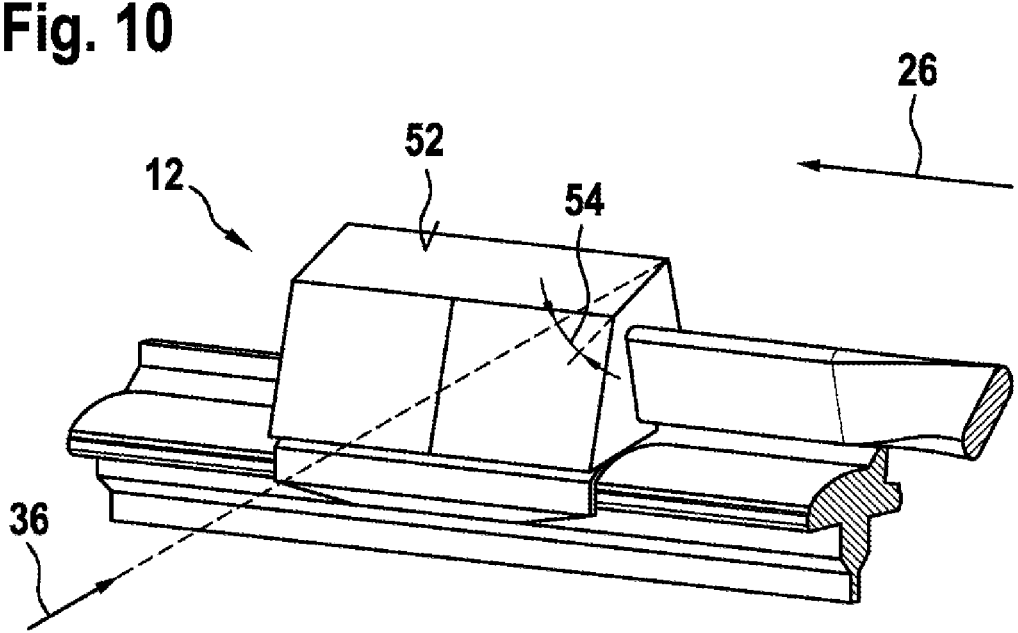
Figure 11:
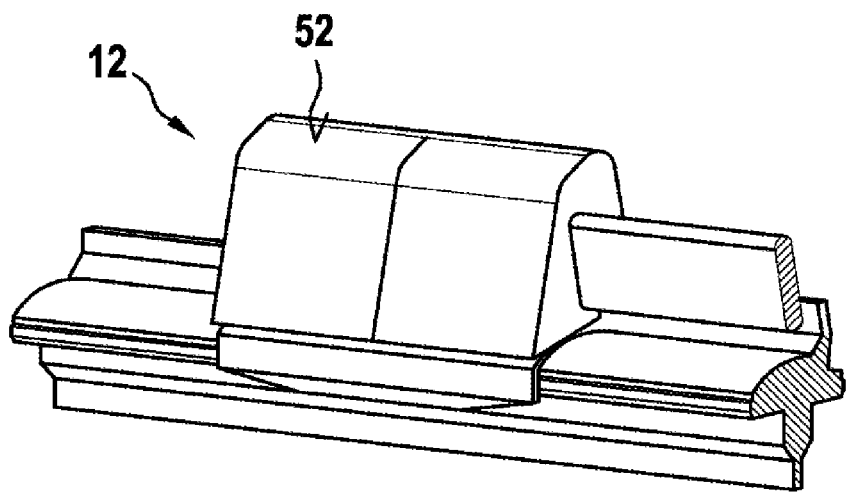

FIG. 10 shows a variant of the adapter unit in which an upper face 52 encloses an upper angle 54 with the wind flow direction 36. FIG. 11 shows an additional variant, in which the upper face 52 is constructed to be convex.

Figure 12:
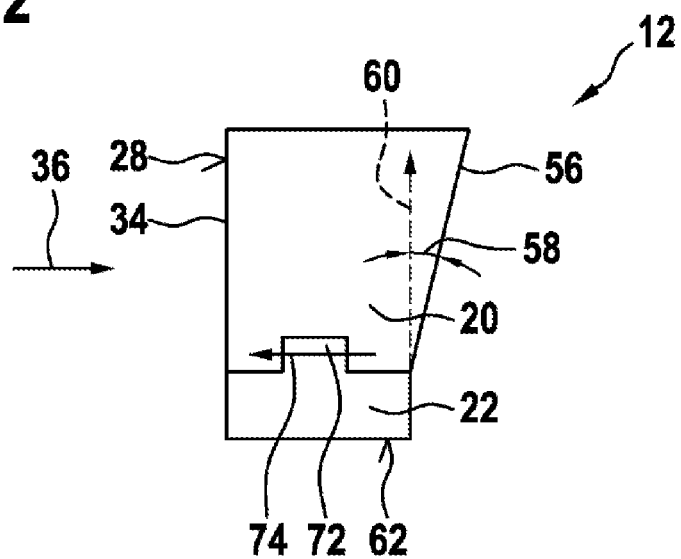
FIG. 12 is a side view of a variant of the adapter unit.

FIG. 12 is a cross-section through the adapter unit of the embodiment (see FIG. 2) along the separation line and perpendicularly to the wiper arm direction 26. A rear side 56 of the adapter unit is tilted about a rear angle 58 of 15° relative to a surface normal 60 of an adapter base face 62. In the mounted state of the adapter unit, the adapter base face is preferably orientated parallel or substantially parallel with the vehicle window.

Figure 13:
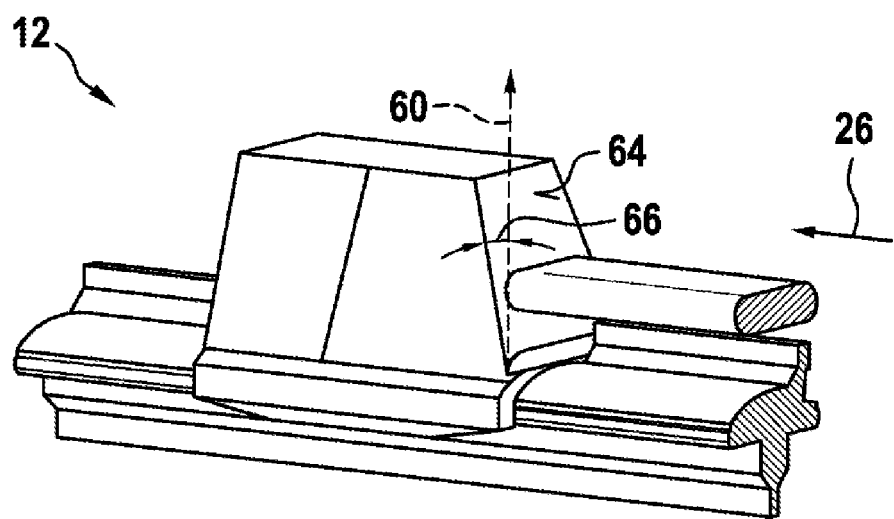
FIGS. 13 to 19 are perspective views of different variants of the adapter unit.
Figure 14:
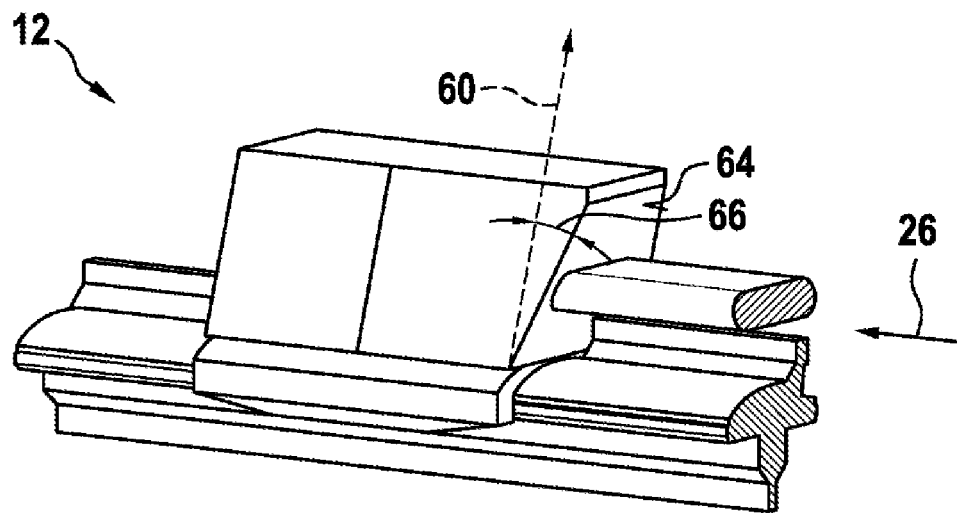

FIG. 13 shows a variant, in which a wiper-arm-facing surface 64 is tilted relative to the surface normal 60 about a right-handed angle 66 of 10° in the wiper arm direction 26. FIG. 14 shows a variant, in which a wiper-arm-facing surface 64 is tilted relative to the surface normal 60 about a right-handed angle 66 of 15° relative to the wiper arm direction 26.

Figure 15:
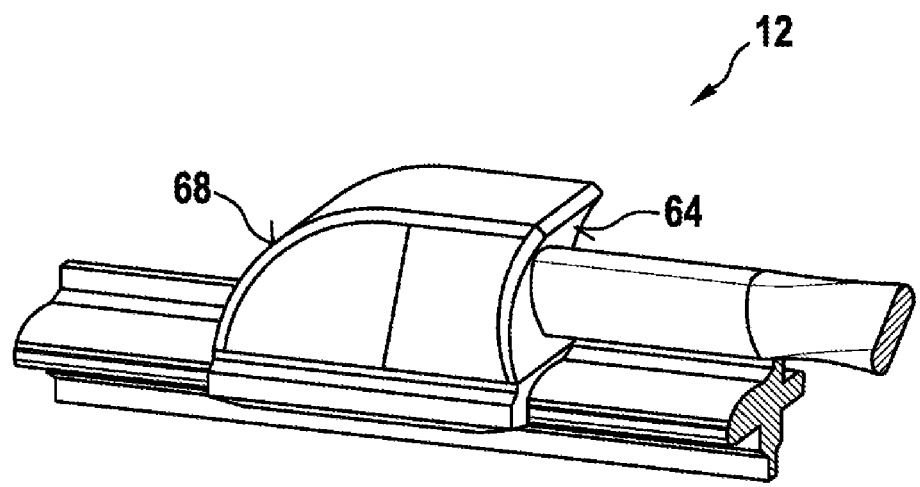
Figure 16:
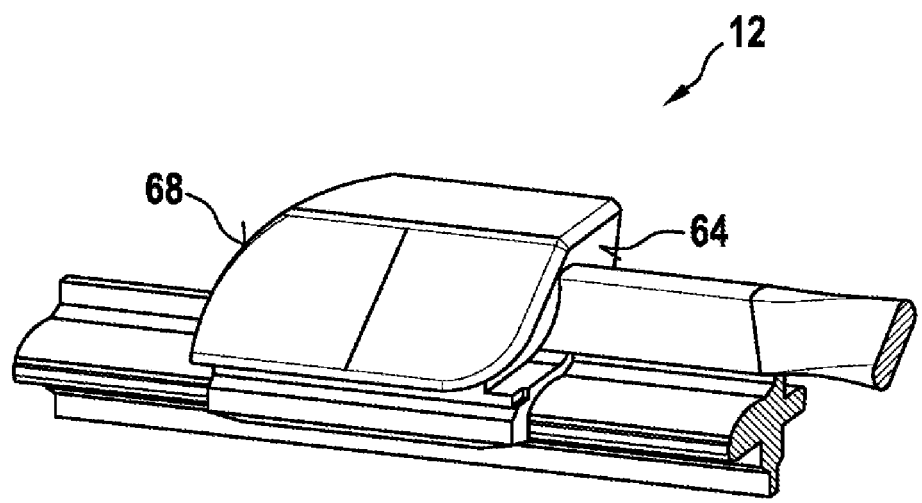
Figure 17:
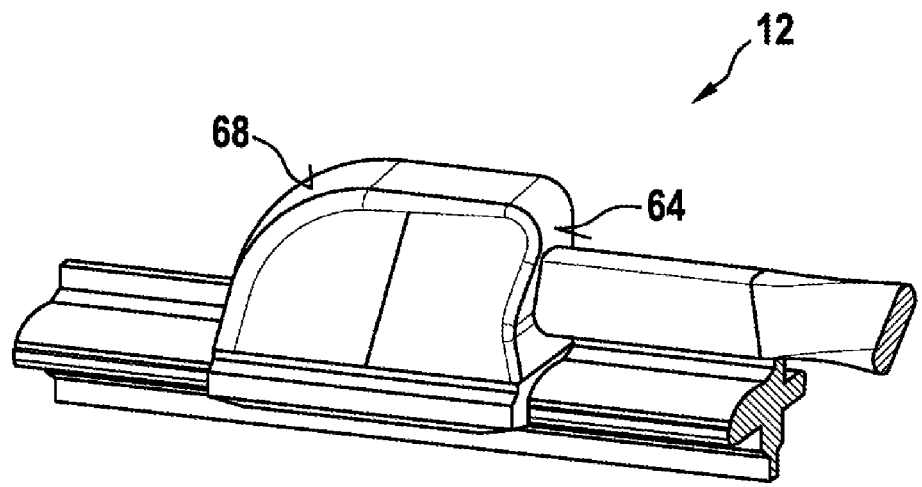

FIG. 15 shows a variant, in which the wiper-arm-facing surface 64 is constructed to be concave. FIG. 16 shows a variant, in which the wiper-arm-facing surface 64 is constructed to be convex. FIG. 17 shows a variant, in which the wiper-arm-facing surface 64 is constructed to be concave in regions. The wiper-arm-facing surface 64 in the variant depicted in FIG. 17 is constructed to be convex in regions.

Figure 18:
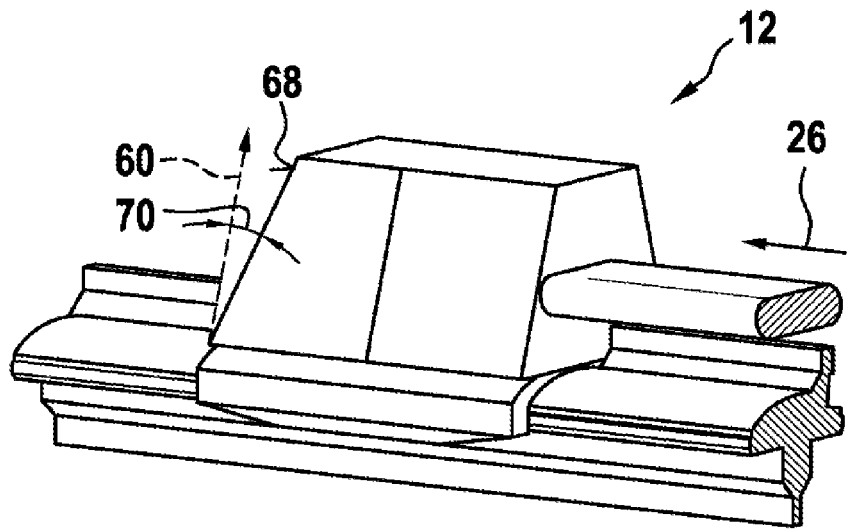
Figure 19:
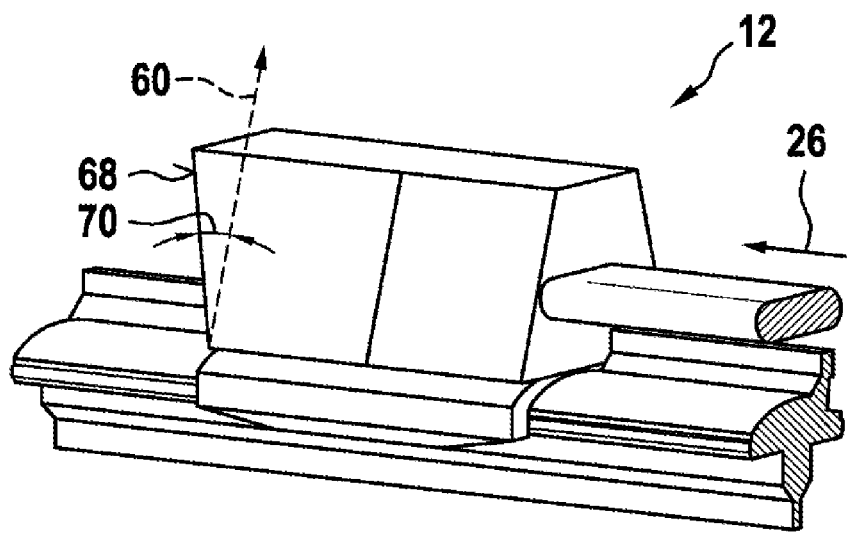

FIG. 18 shows a variant, in which a wiper-arm-remote surface 68 is tilted relative to the surface normal 60 about a left-handed angle 70 of 15° counter to the wiper arm direction 26. FIG. 19 shows a variant, in which a wiper-arm-remote surface 68 is tilted relative to the surface normal 60 about a left-handed angle 70 of 10° in the wiper arm direction 26.

In the variants of the adapter unit shown in FIGS. 15 to 17, the wiper-arm-remote surface 68 is constructed to be convex.

In the variant depicted in FIG. 12, the covering element 20 can be securely connected to the base element 22 via a locking connection which is not shown. The base element 22 has a wiper arm receiving member 72. The wiper arm receiving member 72 is configured to be connected to the wiper arm so that the wiper arm can be pivoted or rotated about a bearing axis 74. The base element 22 is configured to receive the wiper blade via a plug type connection which is not shown.

Figure 20:
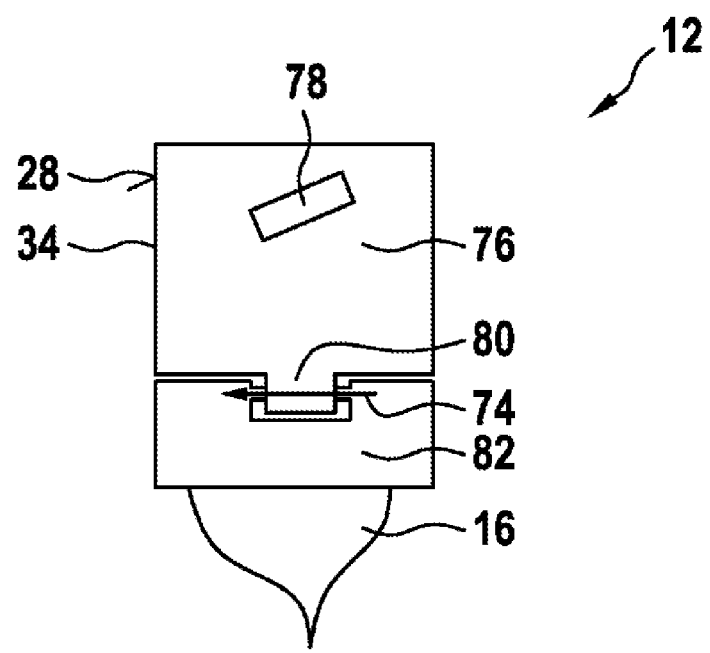
FIG. 20 is a side view of a variant of the adapter unit.

FIG. 20 is a cross-section through an alternative embodiment of the adapter unit along the separation line and perpendicularly to the wiper arm direction 26. The adapter unit 12 has a wiper arm adapter unit 76. The wiper arm adapter unit has the wind deflector face 28. The wiper arm adapter unit has a wiper arm opening 78 which is configured to receive the wiper arm. The wiper arm opening is an opening for a receiving channel, in which the wiper arm can be introduced. The receiving channel extends substantially parallel with the wiper arm direction. The wiper arm adapter unit has in the embodiment a fixing means which is not depicted and which is provided for releasably connecting the wiper arm to the wiper arm adapter unit. The wiper arm adapter unit 76 has a wiper blade adapter unit receiving member 80 which is provided to pivotably receive a wiper blade adapter unit 82 about a bearing axis 74. The wiper blade adapter unit 82 is configured to receive the wiper blade 16.

In advantageous embodiments, the wind deflector face 28 has a changed or particular surface structure. The surface may be roughened at least in regions and/or have a shark-skin-like structure and/or have a golf-ball-like structure. Such a surface structure influences the air stream which flows over it. In this manner, the aerodynamic properties of the wind deflector face can be improved. It is particularly possible to adjust pressing forces which act via the wind deflector face by selecting the type and arrangement of the changed surface structure in a precise manner.

What is claimed is:

1. A wiper assembly comprising an adapter unit and a wiper blade and a wiper arm, wherein the adapter unit is configured to connect the wiper blade to the wiper arm, wherein the wiper arm extends along a wiper arm direction that is parallel with a main longitudinal extent of the adapter unit, the adapter unit comprising a wind deflector face which is configured to deflect an incoming flow of air and to press the wiper blade against a vehicle window, characterized in that the wind deflector face has at least a planar first part-face and a planar second part-face, wherein the first part-face and the second part-face are separated by a separation line, wherein the separation line extends perpendicular to the wiper arm direction, wherein the first part-face has a different orientation from the second part-face, wherein the first part-face is arranged at a first angle between 5° and 30° relative to the second part-face, wherein the first angle is the angle between a surface normal of the first part-face and a surface normal of the second part-face.

2. The wiper assembly as claimed in claim 1, characterized in that the wind deflector face encloses a main angle between 25° and 75° with a wind flow direction, wherein the main angle is an angle which the wind deflector face has with respect to the wind flow direction, and wherein the wind flow direction is perpendicular to the wiper arm direction.

3. The wiper assembly as claimed in claim 1, characterized in that the first part-face and the second part-face coincide at least partially in the separation line and define a second angle at the separation line, wherein the second angle is located at an outer side of the wind deflector face or at a wind-facing side of the wind deflector face and the second angle is between 180° and 270°.

4. The wiper assembly as claimed in claim 3, characterized in that the first part-face and the second part-face coincide at least partially in the separation line and define a third angle at the separation line, wherein the third angle is located at an outer side of the wind deflector face or at a wind-facing side of the wind deflector face and the third angle is between 90° and 180°.

5. The wiper assembly as claimed in claim 1, characterized by a rear side which is arranged at a side of the adapter unit opposite the wind deflector face and which is arranged at a downwind side of the adapter unit, wherein the rear side is tilted by a rear angle between 10° and 40° relative to a surface normal of an adapter unit base face, so that the rear side projects beyond the adapter unit base face in the wind flow direction.

6. The wiper assembly as claimed in claim 1, characterized by a wiper-arm-facing surface arranged at a side of the adapter which is configured to introduce and/or receive the wiper arm for connection to the adapter unit, wherein the wiper-arm-facing surface is tilted by a right-handed angle between 10° and 40° relative to a surface normal of an adapter unit base face.

7. The wiper assembly as claimed in claim 6, characterized in that the wiper-arm-facing surface is constructed to be concave at least in regions.

8. The wiper assembly as claimed in claim 1, characterized by a wiper-arm-remote surface which is arranged opposite a side of the adapter unit which is provided so that the wiper arm is connected to the adapter unit at that side, wherein the wiper-arm-remote surface is tilted by a left-handed angle between 10° and 40° relative to a surface normal of an adapter unit base face.

9. The wiper assembly as claimed in claim 8, characterized in that the wiper-arm-remote surface is constructed to be convex at least in regions.

10. The wiper assembly as claimed in claim 1, characterized in that the adapter unit is configured to connect the wiper arm to the wiper blade so as to be pivotable about a bearing axis.

11. The wiper assembly as claimed in claim 1, comprising a base element, a covering element and a wiper arm receiving member which is provided to receive the wiper arm so as to be pivotable about a bearing axis, wherein the covering element is constructed so as to be connectable to the base element and substantially covers the wiper arm receiving member, and wherein the covering element has the wind deflector face, and wherein the base element is configured to receive the wiper blade.

12. The wiper assembly as claimed in claim 1, characterized in that the adapter unit is configured to releasably connect the wiper blade to the wiper arm.

13. The wiper assembly as claimed in claim 1, characterized in that the wind deflector face encloses a main angle between 40° and 60° with a wind flow direction, wherein the main angle is an angle which the wind deflector face has with respect to the wind flow direction, and wherein the wind flow direction is perpendicular to the wiper arm direction.

14. The wiper assembly as claimed in claim 1, characterized in that the first angle is between 10° and 20°.

15. The wiper assembly as claimed in claim 1, characterized in that the first part-face and the second part-face coincide at least partially in the separation line and define a second angle at the separation line, wherein the second angle is located at an outer side of the wind deflector face or at a wind-facing side of the wind deflector face and the second angle is between 190° and 235°.

16. The wiper assembly as claimed in claim 1, characterized in that the first part-face and the second part-face coincide at least partially in the separation line and define a second angle at the separation line, wherein the second angle is located at an outer side of the wind deflector face or at a wind-facing side of the wind deflector face and the second angle is between 200° and 220°.

17. The wiper assembly as claimed in claim 1, characterized in that the first part-face and the second part-face coincide at least partially in the separation line and define a third angle at the separation line, wherein the third angle is located at an outer side of the wind deflector face or at a wind-facing side of the wind deflector face and the third angle is between 135° and 170°.

18. The wiper assembly as claimed in claim 1, characterized in that the first part-face and the second part-face coincide at least partially in the separation line and define a third angle at the separation line, wherein the third angle is located at an outer side of the wind deflector face or at a wind-facing side of the wind deflector face and the third angle is between 150° and 160°.

19. The wiper assembly as claimed in claim 1, characterized by an upper face which is arranged at a downwind side of the wind deflector face and which is orientated parallel or substantially parallel with the wiper arm direction and wherein the upper face encloses an upper angle between 15° and 20° with the wind flow direction so that the upper face is configured to deflect an incoming flow of air and to press the wiper blade against a vehicle window.

20. The wiper assembly as claimed in claim 1, characterized by a rear side which is arranged at a side of the adapter unit opposite the wind deflector face and which is arranged at a downwind side of the adapter unit, wherein the rear side is tilted by a rear angle between 20° and 30° relative to a surface normal of an adapter unit base face, so that the rear side projects beyond the adapter unit base face in the wind flow direction.

21. The wiper assembly as claimed in claim 1, characterized by a wiper-arm-facing surface arranged at a side of the adapter which is configured to introduce and/or receive the wiper arm for connection to the adapter unit, wherein the wiper-arm-facing surface is tilted by a right-handed angle between 20° and 30° relative to a surface normal of an adapter unit base face.

22. The wiper assembly as claimed in claim 1, characterized by a wiper-arm-remote surface which is arranged opposite a side of the adapter unit which is provided so that the wiper arm is connected to the adapter unit at that side, wherein the wiper-arm-remote surface is tilted by a left-handed angle between 20° and 30° relative to a surface normal of an adapter unit base face.

23. The wiper assembly as claimed in claim 1, comprising a base element, a covering element and a wiper arm receiving member which is provided to receive the wiper arm so as to be pivotable about a bearing axis, wherein the covering element is constructed so as to be connectable to the base element and substantially covers the wiper arm receiving member, and wherein the covering element has the wind deflector face, and wherein the base element is configured to receive the wiper blade, and wherein the covering element is constructed to be securely connectable to the base element so that the covering element connected to the base element is substantially non-movable relative to the base element.

24. The wiper assembly as claimed in claim 1, wherein the first part-face has a different geometry from the second part-face.

25. A wiper assembly comprising an adapter unit and a wiper blade and a wiper arm, wherein the adapter unit is configured to connect the wiper blade to the wiper arm, wherein the wiper arm extends along a wiper arm direction that is parallel with a main longitudinal extent of the adapter unit, the adapter unit comprising a wind deflector face which is configured to deflect an incoming flow of air and to press the wiper blade against a vehicle window, characterized in that the wind deflector face has at least a planar first part-face and a planar second part-face, wherein the first part-face and the second part-face are separated by a separation line, wherein the separation line extends perpendicular to the wiper arm direction, wherein the first part-face has a different orientation from the second part-face, wherein the first part-face and the second part-face coincide at least partially in the separation line and define a second angle at the separation line, wherein the second angle is located at an outer side of the wind deflector face or at a wind-facing side of the wind deflector face and the second angle is between 190° and 235°.

26. The wiper assembly as claimed in claim 25, wherein the second angle is between 200° and 220.

27. A wiper assembly comprising an adapter unit and a wiper blade and a wiper arm, wherein the adapter unit is configured to connect the wiper blade to the wiper arm, wherein the wiper arm extends along a wiper arm direction that is parallel with a main longitudinal extent of the adapter unit, the adapter unit comprising a wind deflector face which is configured to deflect an incoming flow of air and to press the wiper blade against a vehicle window, characterized in that the wind deflector face has at least a planar first part-face and a planar second part-face, wherein the first part-face and the second part-face are separated by a separation line, wherein the separation line extends perpendicular to the wiper arm direction, wherein the first part-face has a different orientation from the second part-face, wherein the first part-face and the second part-face coincide at least partially in the separation line and define a third angle at the separation line, wherein the third angle is located at an outer side of the wind deflector face or at a wind-facing side of the wind deflector face and the third angle is between 135° and 170°.

28. The wiper assembly as claimed in claim 27, wherein the third angle is between 150° and 160°.

* * * * *